United States Patent
Safry et al.

(10) Patent No.: US 12,486,926 B2
(45) Date of Patent: *Dec. 2, 2025

(54) PRESS-FIT, FRICTION-RETENTION COUPLING ASSEMBLY BETWEEN HARD, INFLEXIBLE MATERIAL COMPONENTS

(71) Applicant: Newfrey LLC, New Britain, CT (US)

(72) Inventors: Oday Amer Safry, Farmington Hills, MI (US); Najwan Rassam, Troy, MI (US); Jason A. Meyers, Shelby Township, MI (US)

(73) Assignee: Newfrey LLC, New Britain, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/974,625

(22) Filed: Oct. 27, 2022

(65) Prior Publication Data

US 2023/0048081 A1  Feb. 16, 2023

Related U.S. Application Data

(63) Continuation of application No. 16/522,185, filed on Jul. 25, 2019, now Pat. No. 11,486,520.

(51) Int. Cl.
*F16L 13/14* (2006.01)
*F16B 2/00* (2006.01)

(52) U.S. Cl.
CPC .............. *F16L 13/14* (2013.01); *F16B 2/005* (2013.01)

(58) Field of Classification Search
CPC ........... F16L 13/14; F16B 2/005; F16B 4/004; H01M 8/00

(Continued)

(56) References Cited

U.S. PATENT DOCUMENTS 1,227,627 A * 5/1917 Kennedy ............... F16B 37/122
411/968
1,488,948 A * 4/1924 Smith ...................... H01R 9/16
439/387

(Continued)

FOREIGN PATENT DOCUMENTS

CN  104421259 A  3/2015
CN  205908677 U  1/2017

(Continued)

OTHER PUBLICATIONS

International Search Report and Written Opinion in counterpart International Patent Application No. PCT/US2019/044687 dated Oct. 29, 2019.

(Continued)

*Primary Examiner* — Kimberly T Wood
(74) *Attorney, Agent, or Firm* — Harness, Dickey & Pierce, P.L.C.

(57) ABSTRACT

An outer component has an opening therein defining an outer component mating wall, and a collar is configured to be inserted into the opening in the outer component. The collar has a collar mating wall with an outer surface and including a number of protrusions. A recess can surround each protrusion so that an overall protrusion height between a base of the protrusion and a distal end thereof is greater than a protruding distance between an outermost portion of the outer surface of the collar mating wall and the distal end of the protrusion. The configuration of the protrusions, including the number thereof, can be designed to provide a press-fit insertion force of 50 Newtons or less, and to provide a friction retention force sufficient to retain the collar within the opening of the outer component under its own weight, throughout relevant tolerance ranges for the mating walls.

20 Claims, 7 Drawing Sheets

(58) Field of Classification Search
USPC .......... 411/339, 360, 446, 447, 451.1, 451.5, 411/500, 504, 508; 285/345
See application file for complete search history.

(56) References Cited

U.S. PATENT DOCUMENTS

| | | | |
|---|---|---|---|
| 1,774,846 A * | 9/1930 | Rosenberg | F16B 15/06 411/457 |
| 2,191,771 A * | 2/1940 | Olson | F16B 19/02 411/456 |
| 2,993,923 A * | 7/1961 | Warner | C07F 1/005 556/113 |
| 3,019,460 A * | 2/1962 | Corckran | B21G 3/16 411/456 |
| 3,515,419 A * | 6/1970 | Baugh | F16B 19/1027 411/339 |
| D228,340 S * | 9/1973 | Jennings | D8/385 |
| D239,076 S * | 3/1976 | Murakoshi | D8/387 |
| 4,340,145 A * | 7/1982 | Cameron | A47G 25/0692 211/124 |
| 4,760,752 A | 8/1988 | Wield et al. | |
| 4,778,321 A | 10/1988 | Okawa | |
| 5,362,172 A | 11/1994 | Hubbling | |
| 5,897,401 A * | 4/1999 | Fili | H01R 13/41 439/733.1 |
| 6,042,429 A * | 3/2000 | Bianca | H01R 13/41 439/78 |
| 6,193,456 B1 * | 2/2001 | Stumpf | F16B 37/122 411/456 |
| 6,431,023 B1 * | 8/2002 | Yoneyama | G05G 1/04 74/519 |
| 6,659,699 B2 * | 12/2003 | Stoewer | F16B 19/05 411/421 |
| 6,843,630 B2 * | 1/2005 | Sbongk | F16B 21/16 24/453 |
| 7,067,730 B2 * | 6/2006 | Inoue | G10C 3/12 84/439 |
| 7,427,171 B2 | 9/2008 | Tokairin et al. | |
| 7,465,136 B2 * | 12/2008 | Nagayama | F16B 37/122 411/432 |
| 8,322,001 B2 * | 12/2012 | Ehrhardt | F16B 5/123 24/457 |
| 8,756,787 B2 | 6/2014 | Zimmermann et al. | |
| 9,458,876 B2 | 10/2016 | Morris et al. | |
| 9,771,964 B2 * | 9/2017 | Leveen | F16B 12/10 |
| 9,862,166 B2 | 1/2018 | Lopez et al. | |
| 9,939,000 B2 | 4/2018 | Hu | |
| 2005/0025609 A1 * | 2/2005 | Oxford | H04R 1/025 411/339 |
| 2006/0264076 A1 | 11/2006 | Chen | |
| 2009/0243146 A1 * | 10/2009 | Retter | A01G 25/023 264/250 |
| 2011/0138604 A1 * | 6/2011 | Zimmermann | F16D 1/0858 403/375 |
| 2013/0017032 A1 * | 1/2013 | Levey | F16B 37/122 411/103 |
| 2014/0186139 A1 * | 7/2014 | Park | F16B 37/04 470/20 |
| 2015/0063943 A1 | 3/2015 | Morris et al. | |
| 2016/0377203 A1 | 12/2016 | Norman et al. | |
| 2017/0253006 A1 | 9/2017 | Lopez et al. | |
| 2019/0145450 A1 * | 5/2019 | Bentrim | F16B 13/02 411/15 |

FOREIGN PATENT DOCUMENTS

| | | | | |
|---|---|---|---|---|
| CN | 107161319 A | | 9/2017 | |
| DE | 102013210889 A1 | | 12/2014 | |
| EP | 0872649 A2 * | | 10/1998 | |
| GB | 1348152 A * | | 3/1974 | |
| GB | 2188976 A | | 10/1987 | |
| JP | S6334950 Y2 * | | 8/1988 | |
| JP | 2001/234912 A | | 8/2001 | |
| JP | 2002130219 A * | | 5/2002 | |
| WO | WO-2010073872 A1 * | | 7/2010 | ............ F16B 21/086 |
| WO | WO-2011130073 A1 * | | 10/2011 | ............ F16B 37/122 |
| WO | 2018198213 A1 | | 11/2018 | |
| WO | WO-2020053234 A1 * | | 3/2020 | ............. F16B 12/24 |

OTHER PUBLICATIONS

Extended European Search Report issued for corresponding Application No. 19938603.8, dated Jul. 14, 2023.

Office Action mailed Sep. 20, 2023, in corresponding Chinese Application No. 201980098737.2 (including English translation).

* cited by examiner

PRESS-FIT, FRICTION-RETENTION COUPLING ASSEMBLY BETWEEN HARD, INFLEXIBLE MATERIAL COMPONENTS

CROSS-REFERENCE TO RELATED APPLICATIONS

This application is a continuation of U.S. patent application Ser. No. 16/522,185 filed on Jul. 25, 2019. The entire disclosure of the above application is incorporated herein by reference.

FIELD

The present disclosure relates to a press-fit, friction-retention coupling assembly in which the two components being press-fit together are hard, inflexible materials.

BACKGROUND

This section provides background information related to the present disclosure which is not necessarily prior art.

Annular collars can be used to centrally position components within corresponding openings or recesses of another component. For example, in some cases it is desirable that the annular collar be inserted by hand into the corresponding recess and retained by friction fit. Difficulties arise in accomplishing this when both the annular collar and other component with the recess are made of very hard materials. For example, when one of the annular collar and the other component is made of metal and the other is made of an extremely hard plastic material (e.g., a Rockwell R hardness of at least 95 or greater).

Without the flexibility that softer materials provide, it is difficult to both (1) insure the force required to insert the annular collar into the recess is not greater than that which is suitable for manual insertion, and (2) that the contact force between the annular collar and the recess when inserted therein is sufficient to frictionally retain the annular collar within the recess. In some cases, these difficulties can be exacerbated by a further desire to also insure that insertion does not create any plastic shavings that could be left inside the manufactured product.

Without including a flexible material therebetween, the manufacturing tolerances need to be kept exceedingly small for both the outer diameter of the annular collar and the inner diameter of the recess due to the hardness of the components to simultaneously meet such combinations of desires. This is because such desires must be delivered throughout the entire range of manufacturing tolerances for both the outer diameter of the annular collar and the inner diameter of the recess, despite the hardness of the materials from which they are formed.

SUMMARY

This section provides a general summary of the disclosure, and is not a comprehensive disclosure of its full scope or all of its features.

In one aspect of the present disclosure, a press-fit, friction-retention coupling assembly can include an outer component having an opening therein defining an outer component mating wall, and a collar configured to be inserted into the opening in the outer component. Each protrusion is surrounded by a recess within the outer surface so that an overall protrusion height between a base of the protrusion and a distal end thereof is greater than a protruding distance between an outermost portion of the outer surface of the collar mating wall and the distal end of the protrusion. The configuration of the protrusions, including the number of the protrusions, is designed to provide a press-fit insertion force of 50 Newtons or less throughout relevant tolerance ranges for the outer component mating wall and the collar mating wall, and to provide a friction retention force sufficient to retain the collar within the opening of the outer component under an overall weight of the collar throughout the relevant tolerance ranges for the outer component mating wall and the collar mating wall.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
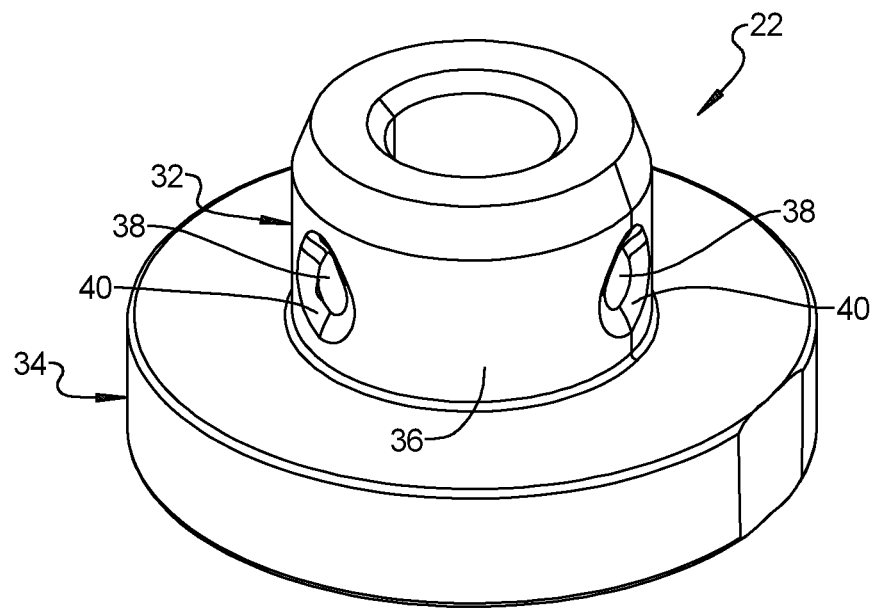
FIG. 1 is a perspective view of one example of an annular collar of a press-fit, friction-retention coupling assembly in accordance with the present disclosure.
Figure 2:
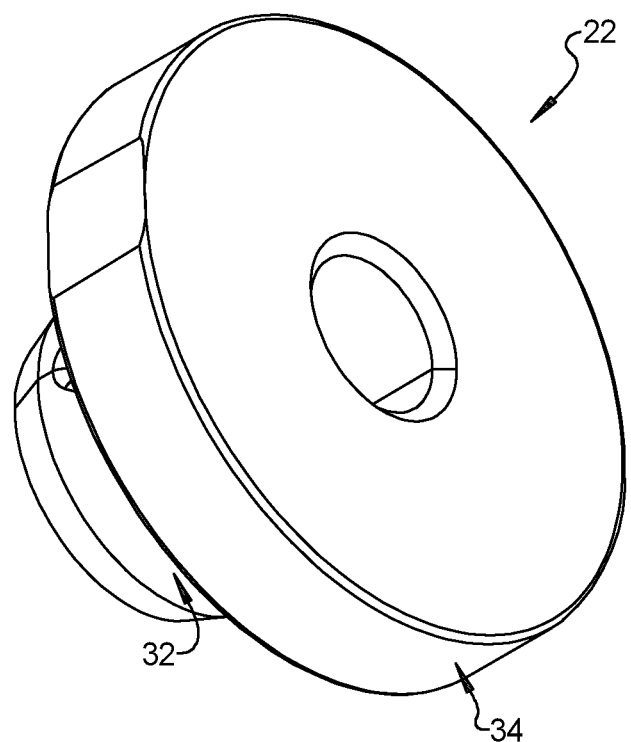
FIG. 2 is another perspective view of the annular collar of FIG. 1.
Figure 3:
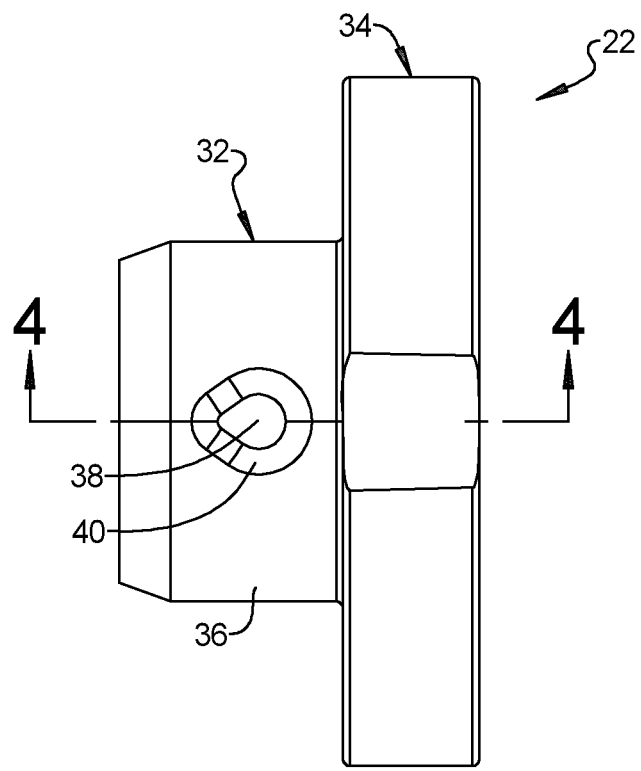
FIG. 3 is a side elevation view of the annular collar of FIG. 1.
Figure 4:
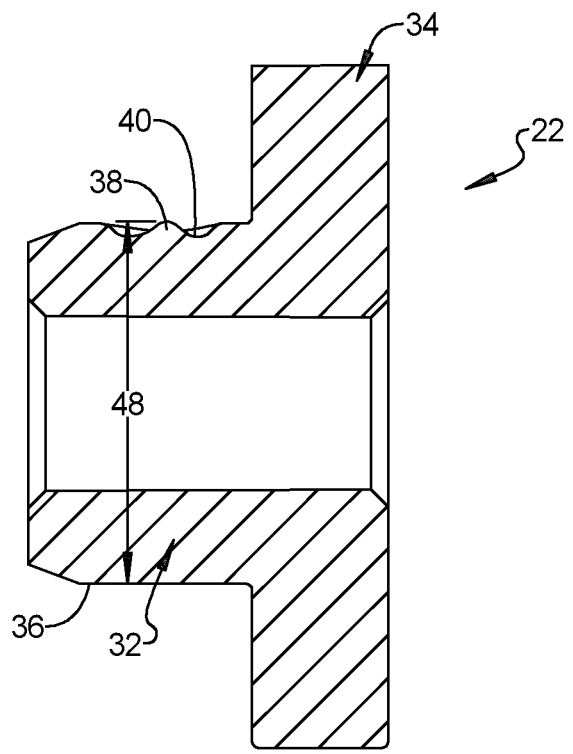
FIG. 4 is a cross-section view taken through line 4-4 of FIG. 3.
Figure 5:
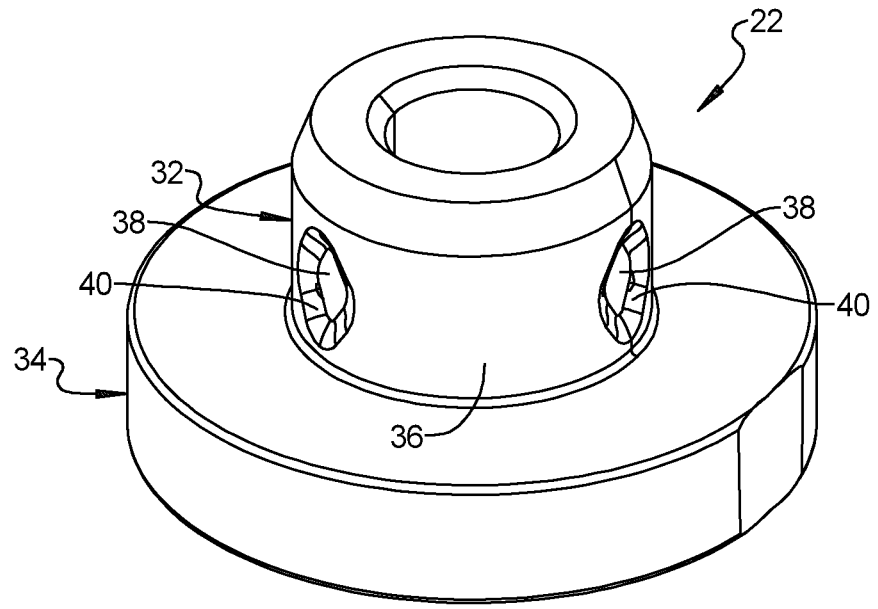
FIG. 5 is a perspective view of another example of an annular collar of a press-fit, friction-retention coupling assembly in accordance with the present disclosure.
Figure 6:
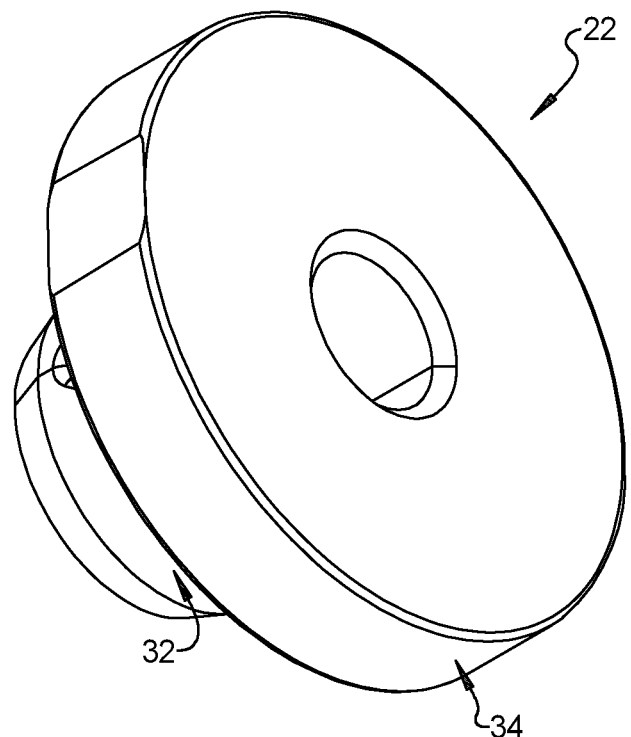
FIG. 6 is another perspective view of the annular collar of FIG. 5.
Figure 7:
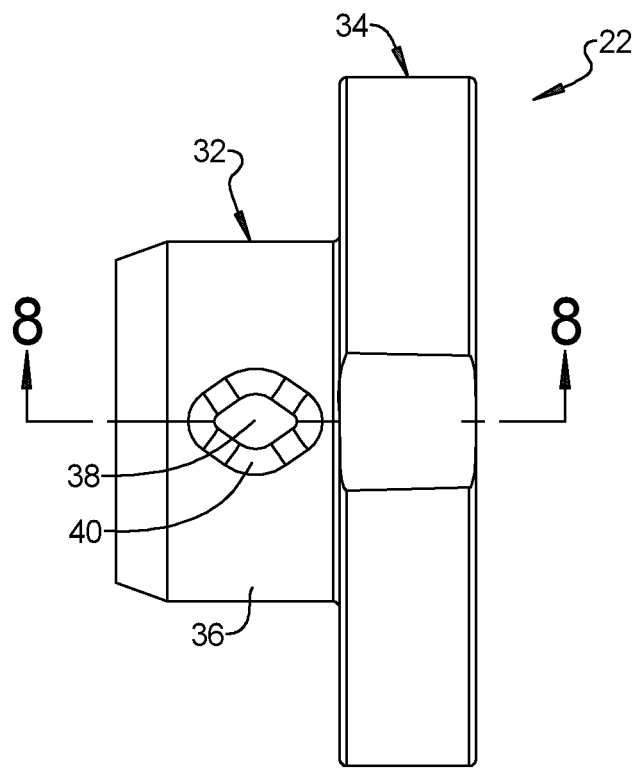
FIG. 7 is a side elevation view of the annular collar of FIG. 5.
Figure 8:
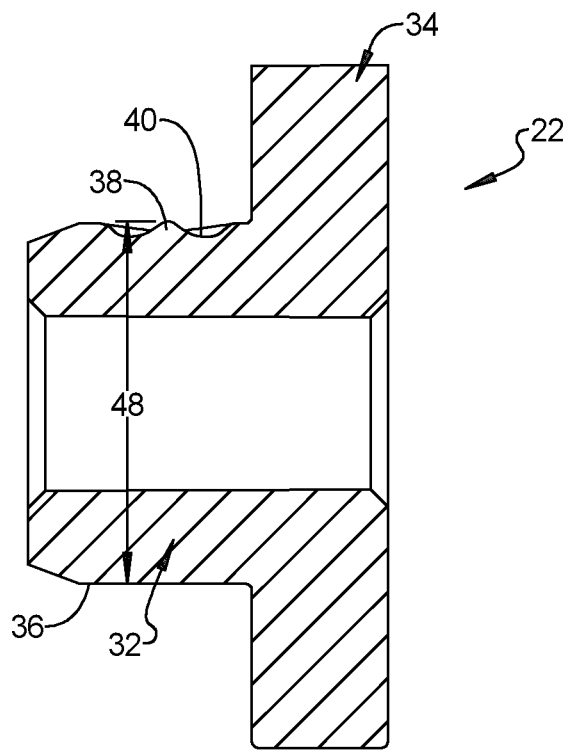
FIG. 8 is a cross-section view taken through line 8-8 of FIG. 7.

Example embodiments will now be described more fully with reference to the accompanying drawings.

With reference to FIGS. 1-10 examples of a press-fit, friction-retention coupling assembly in accordance with the present disclosure are detailed herein. The same reference numbers are used to identify corresponding features throughout the drawings with respect to different example embodiments, regardless of whether the corresponding features are identical or not. The example press-fit, friction-retention coupling assemblies include an outer component 20 and an annular collar 22. The outer component 20 can be formed of an outer material having a Rockwell R hardness of at least 95. In some cases, the Rockwell R hardness of the outer component 20 can be at least 100, 110, 120, or more. In some cases, the outer component 20 can be formed of a metal.

The outer component 20 (FIG. 10) includes a recess 24 therein for receiving the annular collar 22. The recess 24 can be a through-opening in the outer component 20 as illustrated. Alternatively, the recess 24 can extend only partially though the outer component 20. Separately, the recess 24 can be a stepped recess in which each stepped portion 26, 28 has a different diameter. The recess 24 defines an outer component mating wall 30. As in the illustrated example, this mating wall 30 of the outer component 20 can be defined by the smaller diameter step portion 28 of the recess 24. In some other examples, the recess 24 can have a single constant diameter throughout, or the larger diameter step portion can provide the outer component mating wall 30.

The annular collar 22 can be formed of a collar material having a Rockwell R hardness of at least 95. In some cases, the Rockwell R hardness of the collar material of the annular collar 22 can be at least 100, 110, or 120. The annular collar 22 can be formed of a hard polymer material. One exemplary class of such hard polymer materials is glass-filled polymers. One example of a glass-filled polymer comprises polyphenylene sulfide. One example of a glass-filled polymer comprising polyphenylene sulfide is sold by Polyplastics Co., LTD. of Tokyo, Japan, under the trade name polyphenylene Sulfide®.

The annular collar 22 can have a stepped shape in which each step portion 32, 34 has a different diameter. The annular collar 22 defines an annular collar mating wall 36. As in the illustrated example, this mating wall 36 of the annular collar 22 can be defined by the smaller diameter step portion 32 of the annular collar 22. In some other examples, the annular collar 22 can have a single constant diameter throughout, or the larger diameter step portion can provide the annular collar mating wall 36.

The annular collar mating wall 36 can include at least three protrusions 38 with each protrusion 38 being surrounded by a recess 40 in the mating wall 36 so that an overall protrusion height 42 between a base 44 of the protrusion 38 and a distal end 46 thereof is greater than a protruding distance 50 between an outer diameter 48 of a cylindrical outer surface 54 of the annular collar mating wall 36 (i.e., excluding the protrusions 38) and the distal end 46 of the protrusion 38.

The number and configuration of the protrusions 38 of the annular collar mating wall 36 are designed to provide a press-fit insertion force low enough to enable an assembly line worker to manually insert the annular collar 22 into the recess 24 throughout relevant tolerance ranges for the mating walls 30, 36 (including the protrusions 38). In addition, the number and configuration of the protrusions 38 of the annular collar mating wall 36 are also designed to frictionally retain the annular collar 22 within the recess 24 of the outer component 20 under the overall weight of the annular collar 22 throughout relevant tolerance ranges for the mating walls 30, 36. In other words, when the components 20, 22 are oriented so the weight of the annular collar 22 generates the greatest removal force due to the effects of gravity.

As in the example embodiments, a contacting relationship between the protrusions 38 of the annular collar mating wall 36 and the outer component mating wall 30 generates a press-fit insertion force that is 50 Newtons or less throughout the relevant tolerance ranges for the mating walls 30, 36. In some cases, the press-fit insertion force can be up to 35 Newtons, up to 20 Newtons, or up to 10 Newtons throughout the relevant tolerance ranges for the mating walls 30, 36. Additionally or alternatively, the contacting relationship between the protrusions 38 of the annular collar mating wall 36 and the outer component mating wall 30 can generate a friction retention force of at least 5, at least 10 Newtons or at least 20 Newtons throughout the relevant tolerance ranges for the mating walls 30, 36.

The "relevant tolerance ranges for the mating walls" as used herein relate to the tolerance range for the inner diameter 52 of the mating wall 30 of the outer component 20 and for the outer diameter of the mating wall 36 (including the protrusions 38) of the annular collar 22. Thus, "throughout relevant tolerance ranges" spans from a minimum interference corresponding to the largest permissible diameter 52 of the mating wall 30 of the recess 24 in combination with the smallest permissible diameter of the mating wall 36 (including the protrusions 38) of the annular collar 22, to a maximum interference corresponding to the smallest permissible diameter 52 of the mating wall 30 of the recess 24 in combination with the largest permissible diameter of the mating wall 36 (including the protrusions 38) of the annular collar 22.

As in the example embodiments, the protrusions 38 can provide the only contact between the mating walls 30, 36 throughout relevant tolerance ranges for the mating walls 30, 36. As in the example embodiments, the protrusions 38 can provide the only contact between the annular collar 22 and any axially extending portion of the recess 24 of the outer component 20. In other words, there is also a cylindrical gap between the adjacent cylindrical surfaces of the stepped portions 26, 34.

As in the example embodiments of FIGS. 1-4, 9, and 10, the annular recess 40 surrounding the protrusion 38 can have a teardrop shape. In addition, a pointed end of the teardrop shape recess 40 can be oriented toward an insertion end 39 of the mating wall 36 of the annular collar 22. As in the example embodiments of FIGS. 5-8, 9, and 10, the annular recess 40 surrounding the protrusion 38 can have a diamond shape. In addition, the diamond shape surrounding recess 40 can be elongated and can be oriented with the elongated overall dimension extending parallel to a central axis of the mating wall 36 of the annular collar 22. In some other embodiments, different shapes of the annular recess 40 are possible.

Figure 9:
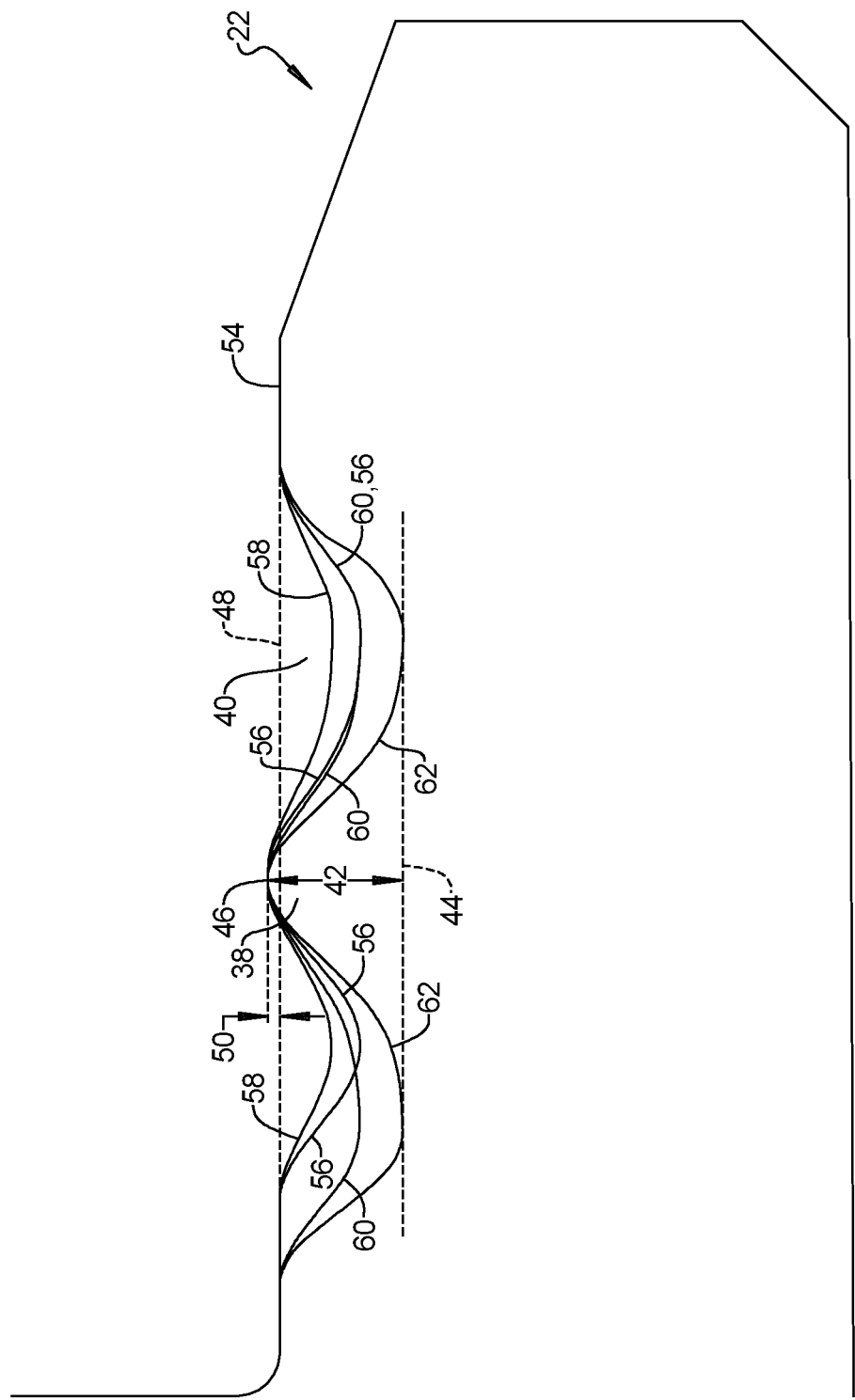
FIG. 9 is a partial cross-section view of alternative recess and protrusion designs in accordance with the present disclosure.
Figure 10:
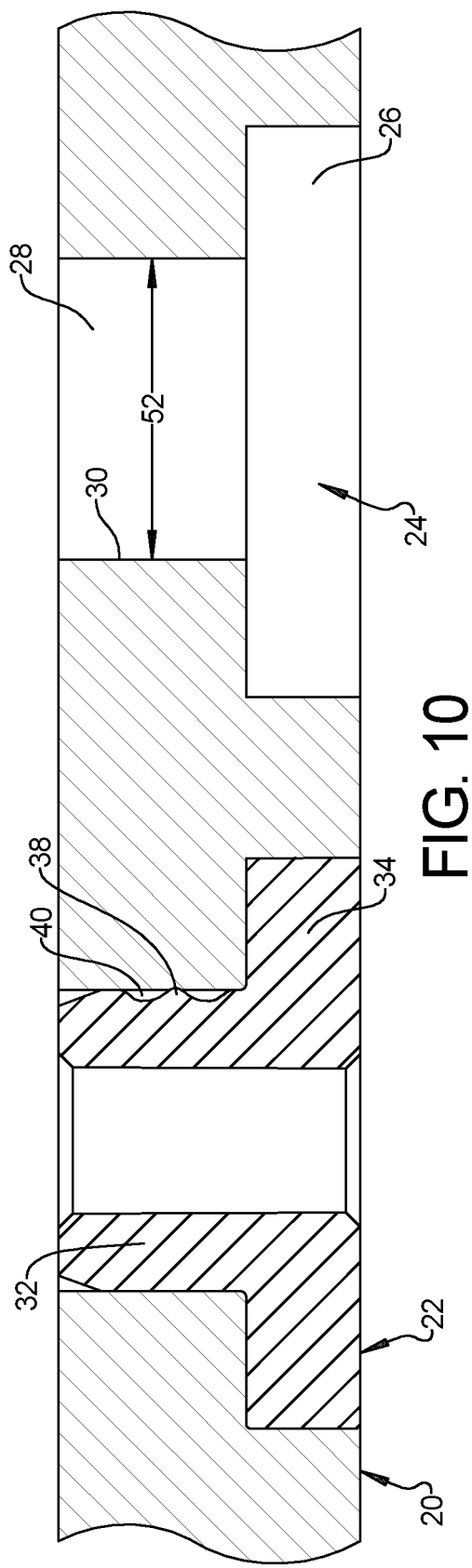
FIG. 10 is a cross-section view of an example press-fit, friction-retention coupling assembly in accordance with the present disclosure.
Figure 11:
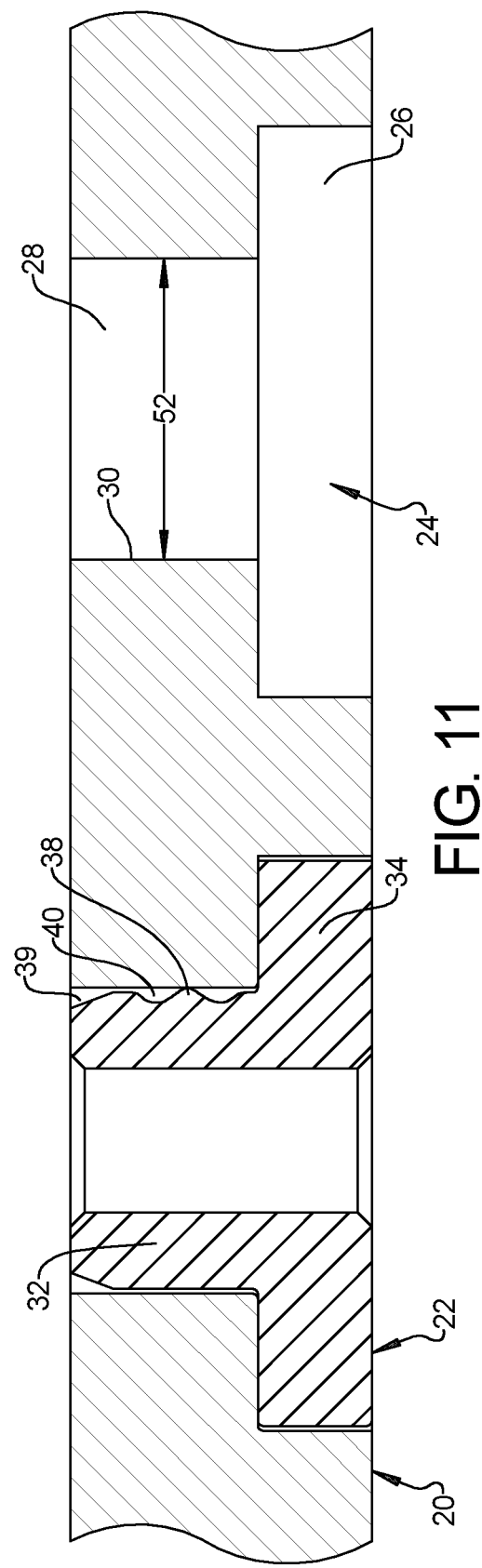
FIG. 11 is a cross-section view similar to FIG. 10 of an example press-fit, friction-retention coupling assembly in accordance with the present disclosure.

Referring to FIG. 9, lines representing four different cross-sections 56, 58, 60, and 62, respectively, of the protrusions 38 with surrounding recesses 40 are illustrated. For better clarity, the base 44, overall distance or height 42 of the protrusion 38 are only referenced in FIG. 9 with respect to the cross-section 62. Two of the cross-sections 56, 58 correspond to protrusions 38 with annular recesses having the teardrop shape and orientation as illustrated in FIGS. 1-6. The difference between these two cross-sections 56, 58 is that the respective protrusion 38 has an overall height 42 that is greater for cross-section 56 than for cross-section 58, due to the increased depth of the respective surrounding recess 40. In addition, the portion of the respective protrusion 38 within the protruding distance 50 has an axially aligned radius that is greater for cross-section 58 than for cross-section 56.

Two of the cross-sections 60, 62 correspond to protrusions 38 with annular recesses having the diamond shape and orientation of FIGS. 5-8. The difference between these two cross-sections 60, 62 is that the respective protrusion 38 has an overall height 42 that is greater for cross-section 62 than for cross-section 60, due to the increased depth of the respective surrounding recess 40. In addition, the portion of the respective protrusion 38 within the protruding distance 50 has an axially aligned radius that is greater for cross-section 60 than for cross-section 62.

As in the example embodiments, the overall protrusion height 42 between the base 44 of the protrusion 38 and the distal end 46 of each protrusion 38 can be at least 4.5 times, 5.5 times, or 6 times the protruding distance 50, which is the distance between the outer diameter 48, a cylindrical outer surface 54 of the annular collar mating wall 36 (excluding the protrusions 38), and the distal end 46 of the protrusion 38. In some embodiments, this overall protrusion height 42 can be up to 10.5 times, or 8.5 times the protruding distance 50 for each protrusion 38.

As in the example embodiments, in some cases the portion of each protrusion 38 within the protruding distance 50 can have an axially aligned radius that can be at least 0 mm, at least 0.01 mm, at least 0.2 mm, or at least 0.4 mm. Additionally or alternatively, in some embodiments, the portion of each protrusion 38 within the protruding distance 50 has an axially aligned radius that can be up to 2.0 mm, up to 1.5 mm, or up to 1.3 mm.

As in the example embodiments, in some cases the minimum interference between the protrusions 38 of the annular collar mating wall 36 and the mating wall 30 of the recess 24 of the outer component 20 throughout the relevant tolerance ranges can be at least 0 mm, at least 0.01 mm, or 0.02 mm. Alternatively or additionally, the maximum interference between the protrusions 38 of the annular collar mating wall 36 and the mating wall 30 of the recess 24 of the outer component 20 throughout the relevant tolerance ranges can be up to 0.07 mm, up to 0.05 mm, or up to 0.03 mm.

In some cases, a plurality of press-fit, friction-retention coupling assembly be used in forming a fuel cell stack. In some cases, the collar material forming the annular collar 22 can have a high chemical resistance. In some cases, the collar material forming the annular collar 22 can have a high temperature resistance. For example, the inner material forming the annular collar 22 can have a temperature resistance that is at least −40 degrees C. and up to 266 degrees C.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A press-fit, friction-retention coupling assembly comprising:
    an outer component having an opening therein defining an outer component mating wall; and
    a collar configured to be inserted into the opening in the outer component, the collar having a collar mating wall with an outer surface and including a number of protrusions protruding from the outer surface, each protrusion being surrounded by a recess within the outer surface so that an overall protrusion height between a base of the protrusion and a distal end thereof is greater than a protruding distance between an outermost portion of the outer surface of the collar mating wall and the distal end of the protrusion,
    wherein each protrusion included in the number of protrusions has only one perimeter, and each recess has a diamond shape that surrounds the entire perimeter of one of the protrusions included in the number of protrusions, the diamond shape being a parallelogram with two acute angles and two obtuse angles,
    wherein a configuration of the protrusions, including the number of the protrusions, is designed to provide a press-fit insertion force of 50 Newtons or less throughout relevant tolerance ranges for the outer component mating wall and the collar mating wall, and to provide a friction retention force sufficient to retain the collar within the opening of the outer component under an overall weight of the collar throughout the relevant tolerance ranges for the outer component mating wall and the collar mating wall, and
    wherein the collar is formed of a collar material that is a polymer material.

2. The press-fit, friction-retention coupling assembly of claim 1, wherein the collar is annular, and the outer surface is cylindrical.

3. The press-fit, friction-retention coupling assembly of claim 1, wherein the outer component is formed of an outer material having a Rockwell R hardness of at least 95 and the collar material has a Rockwell R hardness of at least 95.

4. The press-fit, friction-retention coupling assembly of claim 3, wherein the collar material is a glass-filled polymer.

5. The press-fit, friction-retention coupling assembly of claim 4, wherein the collar material comprises polyphenylene sulfide.

6. The press-fit, friction-retention coupling assembly of claim 3, wherein the outer material is a metal.

7. The press-fit, friction-retention coupling assembly of claim 1, wherein the protrusions provide the only contact between the outer component mating wall and the collar mating wall throughout the relevant tolerance ranges for the collar mating wall and the outer component mating wall.

8. The press-fit, friction-retention coupling assembly of claim 1, wherein the diamond shape is elongated and oriented with an elongated overall dimension extending parallel to a central axis of the collar.

9. The press-fit, friction-retention coupling assembly of claim 1, wherein the overall protrusion height of each protrusion is between 4.5 times and 10.5 times the protruding distance.

10. The press-fit, friction-retention coupling assembly of claim 1, wherein a minimum and a maximum interference between the opening of the outer component and the collar, including the protrusions, throughout the relevant tolerance ranges for the collar mating wall and the outer component mating wall is 0 mm or more and 0.07 mm or less, respectively.

11. A fuel cell stack including a plurality of the press-fit, friction-retention coupling assembly of claim 1.

12. The press-fit, friction-retention coupling assembly of claim 1, wherein the opening in the outer component has a stepped cylindrical shape with a first portion having a first diameter and a second portion having a second diameter that is less than the first diameter.

13. The press-fit, friction-retention coupling assembly of claim 1, wherein the entire collar is disposed within the outer component.

14. The press-fit, friction-retention coupling assembly of claim 1, wherein the collar mating wall surrounds a bore extending through the annular collar, and the bore is threadless along its entire length.

15. A press-fit, friction-retention coupling assembly comprising:
an outer component having a cylindrical opening therein defining an outer component mating wall; and
an annular collar configured to be inserted into the cylindrical opening in the outer component and configured to be retained in the cylindrical opening by a friction fit, the annular collar having a bore extending therethrough and an annular collar mating wall with a cylindrical inner surface surrounding the bore, the annular collar mating wall having a cylindrical outer surface and at least three protrusions protruding from the cylindrical outer surface and spaced apart from one another about a circumference of the cylindrical outer surface, each protrusion being surrounded by a recess within the cylindrical outer surface so that an overall protrusion height between a base of the protrusion and a distal end thereof is greater than a protruding distance between an outermost portion of the cylindrical outer surface of the annular collar mating wall and the distal end of the protrusion, wherein each recess is indented relative to the outermost portion of the cylindrical outer surface of the annular collar mating wall, each recess does not extend through the cylindrical inner surface of the annular collar mating wall, and each recess has a diamond shape that surrounds the entire perimeter of one of the at least three protrusions, the diamond shape being a parallelogram with two acute angles and two obtuse angles, and wherein the annular collar is formed of a collar material that is a polymer material.

16. The press-fit, friction-retention coupling assembly of claim 15, wherein the outer component is formed of an outer material having a Rockwell R hardness of at least 95 and the collar material has a Rockwell R hardness of at least 95.

17. The press-fit, friction-retention coupling assembly of claim 15, wherein the protrusions provide the only contact between the outer component mating wall and the annular collar mating wall throughout relevant tolerance ranges for the annular collar mating wall and the outer component mating wall.

18. An annular collar configured to be inserted into a cylindrical opening in an outer component and configured to be retained in the cylindrical opening by a friction fit, the annular collar comprising:
an annular collar mating wall surrounding a bore extending through the annular collar, the annular collar mating wall having a cylindrical inner surface and a cylindrical outer surface, the cylindrical inner surface defining the bore; and
a number of protrusions protruding from the cylindrical outer surface of the annular collar mating wall and spaced apart from one another about a circumference of the cylindrical outer surface, each protrusion being surrounded by a recess within the cylindrical outer surface so that an overall protrusion height between a base of the protrusion and a distal end thereof is greater than a protruding distance between an outermost portion of the cylindrical outer surface of the annular collar mating wall and the distal end of the protrusion, wherein each recess is indented relative to the outermost portion of the cylindrical outer surface of the annular collar mating wall, each recess does not extend through the cylindrical inner surface of the annular collar mating wall, and each recess has a diamond shape that surrounds the entire perimeter of one of the protrusions included in the number of protrusions, the diamond shape being a parallelogram with two acute angles and two obtuse angles, and wherein the annular collar is formed of a collar material that is a polymer material.

19. The annular collar of claim 18, wherein the collar material has a Rockwell R hardness of at least 95.

20. The annular collar of claim 19, wherein the number of the protrusions is at least three.

* * * * *